United States Patent Office 3,442,861
Patented May 6, 1969

3,442,861
POLYAMIDE-ACID AND POLYIMIDE POLYMERS CROSS-LINKED WITH SELECTED ALDEHYDES AND KETONES
Erhard F. Hoegger, Ardentown, Wilmington, Del., assignor to E. I. du Pont de Nemours and Company, Wilmington, Del., a corporation of Delaware
No Drawing. Filed May 2, 1966, Ser. No. 546,539
Int. Cl. C08g 20/32, 20/40
U.S. Cl. 260—64                                   3 Claims

ABSTRACT OF THE DISCLOSURE

Cross-linked aromatic polyimide polymers cross-linked by use of a ketone or aldehyde, which are effective adhesives for other polyimides.

---

This invention relates to polyamide-acid and polyimide polymers.

According to the present invention, there is provided novel cross-linked polymer products formed by reaction of a class of aromatic polyamide-acids and polyimides with a class of selected aldehydes and ketones.

The properties of the final cross-linked polymer renders it particularly suitable to meet specific end uses without substantial loss of the desirable mechanical, electrical, thermal and other qualities of the polyamide-acids and polyimides. For example, the cross-linked product adds desired rigidity to finished products in such applications as adhesives, coatings, etc.

The polyamide-acids and polyimides which according to this invention can be advantageously cross-linked as described below are basically of two groups.

GROUP I

Polyamide-acids and polyimides consisting essentially of at least one of the following recurring structural units:

(1)

$$\left[ -NH-\overset{O}{\underset{\|}{C}}\underset{R}{\overset{HOOC\quad COOH}{\diagup\diagdown}}\overset{O}{\underset{\|}{C}}-NH-R^1- \right]_n$$

and (2)

$$\left[ -N\underset{\overset{\|}{O}}{\overset{\overset{\|}{O}}{\underset{C}{\overset{C}{\diagdown}}}}\underset{R}{\overset{\overset{\|}{O}}{\underset{C}{\overset{C}{\diagup}}}}\underset{\overset{\|}{O}}{N-R^1-} \right]_n$$

where the arrows denote isomerism;
R is a radical selected from the group consisting of

[structural formulas]

where $R^2$ is selected from the group consisting of an alkylene chain having 1–3 carbon atoms, $-O-$, $-S-$, $-SO_2-$, $$-\overset{O}{\underset{\|}{C}}-,\ -\overset{O}{\underset{\|}{C}}-O-,\ -\underset{R^2}{\overset{R^3}{N}}-,\ -\underset{R^4}{\overset{R^3}{Si}}-,\ -O-\underset{R^4}{\overset{R^3}{Si}}-O-,\ -\underset{\overset{\|}{O}}{\overset{R^3}{P}}-$$

and $$-O-\underset{\overset{\|}{O}}{\overset{R^3}{P}}-O-$$

where $R^3$ and $R^4$ are selected from the group consisting of alkyl and aryl and substituted groups thereof;
$R^1$ is a radical selected from the group consisting of

[structural formulas]

where $R^2$ has the same meaning as above;
$n$ is a number sufficient that said polymer has an inherent viscosity of at least 0.1 as measured at 30° C. of an 0.5% by weight solution in concentrated sulfuric acid; and wherein at least one of said R and $R^1$ radicals per each thirty of said recurring structural units contains at least one $-CH_2-$ group which is directly joined to a carbon atom which is selected from the group consisting of the following carbon atoms: (a) the carbon atom in a $-C\equiv N$ group, (b) the carbon atom in a $$-\underset{|}{C}=O$$

group, (c) a carbon atom participating in an olefinic bond, and (d) a carbon atom which is a member of an aromatic ring.

GROUP II

Polyamide-acids and polyimides consisting essentially of at least one of the recurring structural units of Formulas 1 and 2 above, wherein all of the symbols have the same meaning as above;
and wherein at least one of said R and $R^1$ radicals per each thirty of said recurring structural units contains at least one radical selected from the group consisting of the following seven radicals:
(1) A $$-\underset{|}{C}H-$$

group which is directly joined to a carbon atom selected from the group consisting of the following carbon atoms: (a) the carbon atom in a $-C\equiv N$ group, (b) the carbon atom in a $$-\underset{|}{C}=O$$

group, (c) a carbon atom participating in an olefinic bond, and (d) a carbon atom which is a member of an aromatic ring;

(2) A hydroxyl group (—OH);
(3) A mercapto group (—SH);
(4) An amido group

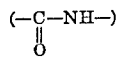

(5) A thioamido group

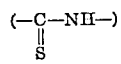

(6) A sulfonamido group

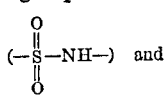 and (7) A secondary amino group (—NH—).

It will be understood that the polymers defined above can be from 0 to 100% polyamide-acid units of Formula 1 above and from 100% to 0 polyimide units of Formula 2 above, such polymers containing at least one of the above-described essential groups. The above polymers can be prepared by condensation.

The above polymers can be prepared by condensation polymerization procedures known in the art and described for example in Edwards U.S. Patent No. 3,179,614; Endrey U.S. Patent No. 3,179,630; Endrey U.S. Patent No. 3,179,633; and Edwards U.S. Patent No. 3,179,634; all issued Apr. 20, 1965. Using the techniques described in the patent just mentioned, one or more aromatic tetracarboxylic acid dianhydrides is reacted with one or more aromatic diamines of structures such as to obtain the above defined polyamide-acid which is then converted to polyimide by thermal or chemical means or both, as described in those patents.

To provide the essential functional group necessary to accomplish the subsequent cross-linking according to this invention, either the starting aromatic tetracarboxylic acid dianhydride or the starting aromatic diamine or both can contain the essential functional group, and enough will of course be used to provide the required amount, i.e. at least one such essential functional group per 30 polymer units.

Illustrative of suitable dianhydrides are the following: 3,3' - methylene diphthalic anhydride; 3,3' - ethylidene diphthalic anhydride; 4,4' - ethylidene diphthalic anhydride; 3-hydroxypyromellitic dianhydride; bis(3,4-dicarboxybenzoyl)methane dianhydride; 2' - acetyl - p-terphenyl - 3,4,3'',4'' - tetracarboxylic dianhydride; 3-beta - cyanoethoxypyromellitic dianhydride; 3 - allyloxypyromellitic dianhydride.

Illustrative of suitable diamines are the following: 3',4 - diaminobenzanilide; 3',4 - diaminobenzthioanilide; p-bis(2 - methyl - 4 - aminopentyl) benzene; m-xylylene diamine; p - xylylene diamine; 3,4' - diaminobenzenesulfonanilide; bis(3-aminophenyl) methane; bis(4-aminophenyl) methane; bis(4-aminophenyl) amine; cumene-2,4-diamine; 3,3'-dihydroxybenzidine; N,N'-bis(gamma-aminopropyl)benzidine; 3,3'-dimercaptobenzidine; 1,6-diamino - 2 - beta - cyanoethoxynaphthalene; 1,4-bis(p-aminophenyl)butene-2; 3,3'-bis(propenyloxy)benzidine.

Position isomers of any of the above listed dianhydrides and diamines can also be used.

Besides the polyamide-acid route described above, the above-described polyimides suitable for cross-linking can also be prepared by the use of appropriately selected polyimide precursors other than polyamide-acids, such as polyisoimides according to procedures described in Angelo U.S. patent application Ser. No. 325,479 filed Nov. 21, 1963, now U.S. Patent 3,282,898; polyamide-esters according to procedures described in Angelo U.S. patent application Ser. No. 311,307 filed Sept. 25, 1963, now U.S. Patent 3,316,211, Angelo U.S. patent application Ser. No. 311,326 filed Sept. 25, 1963, now U.S. Patent 3,282,897, Sorenson U.S. patent application Ser. No. 288,535 filed June 17, 1963, now U.S. Patent 3,312,663, Tatum U.S. patent application Ser. No. 325,497 filed Nov. 21, 1963, now U.S. Patent 3,261,811, and Tocker U.S. patent application Ser. No. 332,889 filed Dec. 23, 1963, now U.S. Patent 3,326,851; and polyamide-amides according to procedures described in Angelo & Tatum U.S. patent application Ser. No. 325,442 filed Nov. 21, 1963, now U.S. Patent 3,316,212; all assigned to the same assignee as that of the present application.

As mentioned above, the novel cross-linked polymer products of this invention are prepared by reaction of the appropriate polyamide-acids and/or polyimides with at least one of a class of aldehydes and ketones. The aldehyde or ketone useful for cross-linking polymers of Group I above will be such that will provide a cross-linking bridge of the formula (3) 

where R''' is a tetravalent radical of 2 through 10 carbon atoms and which can be aliphatic or mixed aliphatic-aromatic, preferably the latter, and with the four valences being paired so that two are attached to one carbon atom and the other two are attached to a second carbon atom. The aldehyde or ketone useful for cross-linking polymers of Group II above will be such that will provide a cross-linking bridge of the formula:

(4) 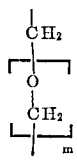

where $m$ is a whole number of zero through 100.

Representative cross-linking agents suitable for providing such bridges include formaldehyde, polyformaldehyde, trioxane, paraldehyde, glyoxal, malonic aldehyde, succinaldehyde, glutaric aldehyde, acetonylacetone, levulinic aldehyde, isophthalaldehyde, terephthalaldehyde, and 1,3-diacetylbenzene.

The reaction which effects the desired cross-linking can be carried out using conventional techniques, illustrated below. The cross-linking agent can be incorporated in the polymer before or after the polymer is shaped, and before or after the polyamide-acid is converted partly or all to polyimide. Preferably, prior to conversion of the polyamide-acids of this invention into the polyimides, the solvent-soluble polyamide-acid will be coated onto any of various substrates, or formed into the desired shape such as a film, fiber, tube, etc. The substrates can be metals, inorganic materials such as glass, mica and asbestos, or organic polymers. Representative metals are copper, aluminum and steel. Glass and the organic polymers can be in the form of sheets, films, woven or nonwoven fabrics, etc.

The amount of cross-linking will depend on such factors as the incidence of available sites and the amount of cross-linking agent or agents used, both factors being determined by the nature of the effect desired, as will readily be understood by persons skilled in this art.

The resulting cross-linked polymers are useful as films, coatings, fibers, papers, wire enamels, impregnants and adhesives. They have excellent properties over a broad use-temperature range and provide an array of materials with a combination of density, and mechanical, electrical and thermal properties suitable for many such uses. The cross-linking of this invention is particularly useful in the adhesives industry, in which polyimides are finding their way, to permit application of high solids solutions of a workable viscosity which will readily wet the surfaces which are to be bonded together. By means of cross-linking, the adhesive becomes insoluble and less fusible at the temperature at which the bond is made. As a result the bond retains good strength but is no longer solvent-sensitive or fusible at functional temperatures.

The cross-linked polyimides are effective adhesives for polyimides, polyamides, metals, glass, asbestos, mica and the like, in any of their physical forms. Bonding is accomplished by coating or impregnating with a solution of the appropriate polyamide-acid, containing a dialdehyde or diketone. The heat required for thermal conversion of the polyamide-acid usually is sufficient to effect cross-linking. If not, additional heating can be used.

The invention will be further understood by reference to the following illustrative examples in which parts and percentages are by weight unless otherwise indicated.

EXAMPLE 1

To 20 milliliters of a 10% solids solution of a polyamide-acid based on bis(4-aminophenyl)methane and benzophenone - 3,4,3',4' - tetracarboxylic dianhydride in N,N-dimethylacetamide (DMAC) (inherent viscosity 0.8 as measured on an 0.5% by weight solution at 30° C. in DMAC) was added 0.1 gram of terephthalaldehyde and it was well mixed until solution was complete. This polymer dope was then cast onto 3-mil films of the polypyromellitimide of bis(4-aminophenyl) ether using a 20-mil knife. The coated films were heated in a circulating air oven at 100–105° C. for about 30 minutes, then at 150° C. for another 30 minutes. Heat seals were made from these films by pressing them (coated to coated side) in a press at 400° C. with 100–300 pounds per square inch pressure for 30 seconds, and the seals were annealed at 300° C. for 30 minutes. The seal strengths of these strips were measured by pulling in a Suter tester at room temperature. The strips were ¼-inch wide. The average seal strength of ten specimens was 2850 grams per inch. Failure occurred mostly by tearing of the base film. Control runs similar to the above run but without added dialdehyde gave average heat seal strengths, under the same conditions, of only 2320 grams per inch. Failure occurred mostly by first peeling then tearing in the middle of the seal.

The polyamide-acid solution was made as follows: 11.9 grams of sublimed 4,4'-diaminodiphenylmethane, which was dried at room temperature in vacuum overnight, was dissolved in 281 grams of DMAC. This solution was reacted under nitrogen with 19.34 grams of benzophenone-3,4,3',4'-tetracarboxylic acid dianhydride, (sublimed and dried at 160° C. in a vacuum oven overnight) by slowly adding the dianhydride powder to the diamine solution. After four hours reaction time, the solution viscosity was constant and the polymer had an inherent viscosity of 0.80 as measured as above.

EXAMPLE 2

To a 20-milliliter portion of a 10% solids solution of the polyamide-acid derived from bis(4-aminophenyl)-methane and benzophenone-3,4,3',4'-tetracarboxylic dianhydride, prepared as in Example 1, was added a solution of 0.1 gram of trioxane in 5 milliliters of DMAC and it was thoroughly stirred at room temperature. This dope was coated onto a film of the polypyromellitimide of bis(4-aminophenyl) ether and the coated film was dried for 30 minutes at 100° C. in a circulating air oven. Seals were prepared by pressing the coated sides together at 400° C. for 30 seconds with about 100 pounds per square inch pressure. The seals were annealed for 30 minutes at 300° C. After cutting seals into ¼-inch strips, the peel strength was measured by peeling in a Suter tester. The average peel strength of these films was 2100 grams per inch.

Control seals prepared exactly as those above except without addition of trioxane gave, in similar tests, peel strengths of only 1840 grams per inch. After aging at 300° C. in air for 20 hours, the cross-linked seals still had a peel strength of 1810 grams per inch (average of 10) whereas uncross-linked controls had only 1330 grams per inch left.

If the trioxane-containing polyamide-acid coating is not first heated at low (160° C.) temperatures but directly at the 400° C. temperatures necessary for preparing heat seals, a sponge film is obtained usable as high and low temperature gasket material.

The foregoing examples can be repeated, as will be readily understood by persons skilled in this art, by substituting other materials within the indicated scope of this invention for those of the specific exemplifications.

It is to be understood that the foregoing detailed description is given merely by way of illustration and that many variations may be made therein without departing from the spirit or scope of this invention.

The invention claimed is:

1. A cross-linked polymer which is the condensation reaction product of at least one cross-linking agent selected from the group consisting of formaldehyde, polyformaldehyde, trioxane, paraldehyde, glyoxal, malonic aldehyde, succimaldehyde, glutaric aldehyde, acetonylacetone, levulinic aldehyde, isophthalaldehyde, terephthalaldehyde and 1,3-diacetylbenzene, and a member of the group consisting of polyimides and polyamide-acids formed with at least one member of the group consisting of 3,3'-methylene diphthalic anhydride, 3,3'-ethylidene diphthalic anhydride, 4,4'-ethylidene diphthalic anhydride, 3-hydroxypyromellitic dianhydride, bis(3,4-dicarboxybenzoyl)methane dianhydride, 2'-acetyl-p-terphenyl-3,4,3'',4''-tetracarboxylic dianhydride, 3-beta-cyanoethoxypyromellitic dianhydride, 3-allyloxypyromellitic dianhydride, 3',4-diaminobenzanilide, 3',4-diaminobenzthioanilide, p-bis(2-methyl-4-aminopentyl) benzene, m-xylylene diamine, p-xylylene diamine, 3,4'-diaminobenzenesulfonanilide, bis(3 - aminophenyl)methane, bis(4-aminophenyl)methane, bis(4 - aminophenyl) amine, cumene - 2,4 - diamino, 3,3' - dihydroxybenzidine, N,N'-bis (gamma-aminopropyl)benzidine, 3,3'-dimercaptobenzidine, 1,6-diamino-2-beta-cyanoethoxynaphthalene, 1,4-bis(p-aminophenyl)butene-2, and 3,3'-bis(propenyloxy) benzidine.

2. A cross-linked polyimide polymer which is the converted condensation reaction product of terephthalaldehyde and a polyamide-acid polymer of bis(4-aminophenyl)methane and benzophenone-3,4,3',4'-tetracarboxylic dianhydride.

3. A cross-linked polyimide polymer which is the converted condensation reaction product of trioxane and a polyamide-acid polymer of bis(4-aminophenyl)methane and benzophenone-3,4,3',4'-tetracarboxylic dianhydride.

References Cited

UNITED STATES PATENTS 3,179,634   4/1965   Edwards.
3,238,181   3/1966   Anderson.

WILLIAM H. SHORT, Primary Examiner.

L. L. LEE, Assistant Examiner.

U.S. Cl. X.R.

260—47, 65, 67.5, 78, 79